Jan. 9, 1962  K. VÖGTLIN ETAL  3,016,278
RECORDER MECHANISM
Filed Dec. 1, 1958  3 Sheets-Sheet 1

INVENTORS
Karl Vögtlin
Walter Rosch
by Michael S. Stryker
Attorney

Jan. 9, 1962 K. VÖGTLIN ETAL 3,016,278
RECORDER MECHANISM
Filed Dec. 1, 1958 3 Sheets-Sheet 3

INVENTORS
Karl Vögtlin and
Walter Ansh
by Michael S. Striker
Attorney

United States Patent Office 3,016,278
Patented Jan. 9, 1962

3,016,278
RECORDER MECHANISM
Karl Vögtlin and Walter Rösch, Villingen, Germany, assignors to Kienzle Apparate G.m.b.H., Villingen im Schwarzwald, Germany
Filed Dec. 1, 1958, Ser. No. 777,343
Claims priority, application Germany Nov. 30, 1957
9 Claims. (Cl. 346—62)

The present invention refers to recording instruments and more particularly to a recorder mechanism for controlling the movements of the recording member which is designed for producing a graphical record on a suitable record carrier.

In the field of recording indicating instruments or devices it is often desirable to record a particular natural or technical phenomenon as a function of time or also as a function of a different phenomenon indicated or measured by the same or a different instrument. In many applications of such instruments and devices it is not necessary to record the phenomenon quantitatively. In many cases it is satisfactory to record on the record carrier the mere fact that at a certain moment or during a certain phase of a particular other action or procedure a particular action or phenomenon has taken place.

For instance it is possible in this manner to record at which time and during what period of time a measured value exceeds a predetermined critical maximum reference value. Also it may be desirable to record in this manner what time a particular control or safety device has been put into operation. In connection with a motor vehicle registering tachometer a recorder mechanism as mentioned above may be used for instance for recording when the operator changes or when other events or incidents occur in the vehicle or in connection therewith.

It is therefore a main object of the present invention to provide for a recorder mechanism which in a particularly efficient manner controls the recording of one or more phenomena.

It is a further object of this invention to provide for a recorder mechanism of the type set forth which is composed of a comparatively small number of parts and therefore assures long and reliable service.

With above objects in view a recorder mechanism according to the invention comprises movable recording means adapted to produce, during movement, a record on a record carrier; heat-responsive means of a type in which, upon heating, at least a portion thereof is displaced; mechanical motion-transmitting means mounted between the heat-responsive means and the movable recording means for transmitting motions of said portion of the former, while being displaced, to the latter, so that the movable recording means produces records proportionate to the displacements of the portion of said heat-responsive means during heating thereof; and electrical means for heating the heat-responsive means.

More particularly, a preferred embodiment of the recorder mechanism of the present invention includes a recording member carrying a recording tip and operatively connected by mechanical motion-transmitting means with a heat-responsive member of a type in which, upon heating, at least a portion thereof is displaced. The temperature of the heat-responsive means is controlled by electric circuit means which, in turn, are influenced by the phenomenon which is to be recorded, particularly in such a manner that a circuit is either opened or closed thereby. Whenever that circuit is closed the heat-responsive member is heated by the effect of an electrical current and the resulting displacement of at least a portion thereof is transmitted mechanically to the recording member. Whenever for instance the above mentioned circuit is opened or closed in response to the phenomenon to be recorded, the recording member is accordingly moved in a predetermined direction and thereby records the start and the end of the particular phenomenon on the record carrier.

Various devices may be used as heat-responsive means in the mechanism according to the invention. The heat-responsive means may consist in a bimetal member which, when a current is caused to flow through it, due to its resistivity heats and bends so that at least a portion thereof is displaced. Similarly a bimetal strip may be heated by means of a heater coil surrounding the bimetal member and creating heat when current is passed through said coil. Also an electrical conductor as for instance a wire which expands longitudinally upon the application of a current may be used as a heat-responsive means. Also a container or enclosure containing a liquid or a gas which would expand upon application of heat may be used as a heat-responsive means for the purpose set forth above.

According to the invention, in the first mentioned case a bimetal member is connected mechanically with the recording member and a heating coil surrounding the bimetal member is heated whenever a circuit which includes the heating coil is switched on or off in accordance with the phenomena being recorded. It is also possible to provide for a so-called oscillating recording operation in which case the recording member carries out oscillating movements during the time through which the particular phenomenon continues. For this purpose interrupter contacts are arranged in series with the above mentioned heating coil. In a further embodiment the recording member carrying the recording tip is made itself out of bimetal and may be surrounded by a second heating coil which is connected in series with the previously mentioned heating coil of the basic-responsive means and with an interrupter contact. In such a case the interrupter contact may also serve as mechanical motion-transmitting means and the regular heat-responsive means may also be a bimetal member. In this case an oscillating recording is obtained on account of the fact that the two different bimetal members have different thermal reaction times so that the interrupter contact is opened and closed due to the different speed of displacement of the operative portions of the two bimetal members.

On the other hand, whenever heat-responsive means are used in which the displacement takes the form of expansion in a particular, preferably longitudinal, direction as for instance in a wire or similar electrical conductor, or also in the case of containers filled with liquid or gas, the recording with the recording mechanism according to the invention may be carried out both in such a manner that only the start and the end of the phenomenon to be recorded is recorded, and also in the form of oscillating recording.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
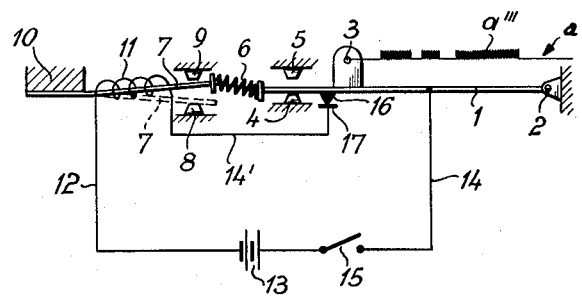
FIG. 2 is another embodiment of the invention including one bimetal member and one interrupter contact.
Figure 7:
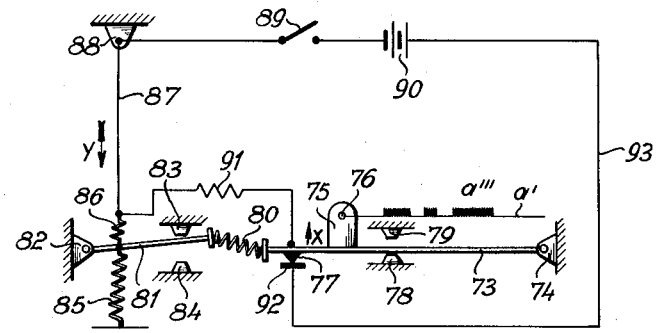
Figure 8:
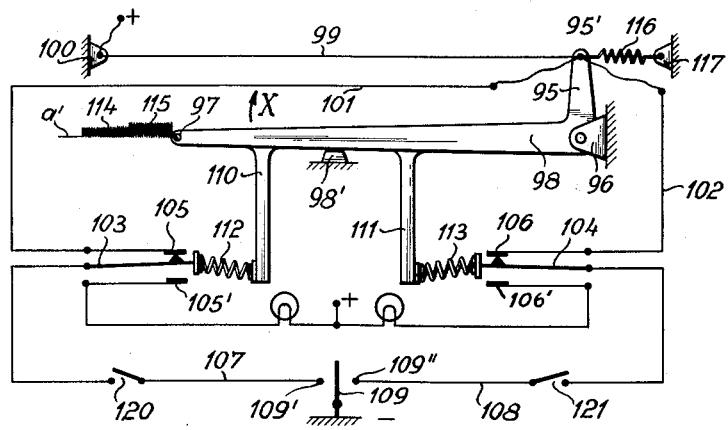

FIG. 7 illustrates an embodiment which substantially corresponds to that illustrated by FIGURE 2, except that here the heat responsive means is an electrical conductor expanding upon heating; and FIGURE 8 is a further embodiment of the invention in which also an electric conductor expanding upon heating is used, but which permits alternative recording of different phenomena on the same record carrier and by means of the same recording member.

Figure 1:
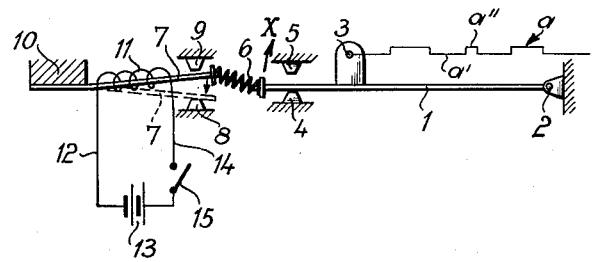
FIG. 1 is a schematic diagram of one embodiment of a recorder mechanism according to the invention, including only one bimetal member.

Referring now to FIGURE 1, a recording member or arm 1 is pivotally movable about a stationary pivot 2 and carries on a lateral extension a recording tip 3. The angular movements of the arm 1 are limited by opposite stops 4 and 5. In the conventional manner the recording tip 3 will produce on a moving record carrier a record line a in such a manner that when the recording member 1 is in the position shown the line portions a' are produced, but when it is moved in the direction of the arrow X the line portions a" will be produced. A bimetal blade 7 is mounted on a stationary support 10 and surrounded by a heating coil 11 which by means of flexible connections 12 and 14 is connected with a battery 13. In the line 14 is inserted a switch or other control means 15 which is operated in any desired manner by means not forming part of this invention so that the switch 15 is closed whenever a phenomenon to be recorded occurs, and is opened when the phenomenon ceases. The bimetal member or blade 7, upon heating, is deflected so that its tip is displaced in the direction of the arrow from the position shown in full lines to the position shown in dotted lines. A compression spring 6 is interposed between the tip of the bimetal blade 7 and the tip of the recording member 1. Stops 8 and 9 limit the movement of the tip of the bimetal plate 7.

This device operates as follows: as soon as the phenomenon to be recorded occurs the switch 15 is closed so that current is applied to the coil 11 whereby the bimetal blade 7 is heated and is thereby caused to bend and to move gradually towards the position shown in dotted lines. During the resulting displacement of the tip of the blade 7 the spring 6 is further compressed and reaches maximum compression when the tip of the blades 7 and of the arm 1 are exactly opposite each other. The moment this condition is passed the blade 7 is snapped by the force of the again expanding spring into the position shown in dotted lines where it abuts against the stop 8 and simultaneously the tip of the arm 1 is snapped in the direction of arrow X against the stop 5. Consequently in this moment the recording tip 3 moves in the same direction so that on the record a change from the line track a' to a line track a" is produced. If on the other hand thereafter the switch 15 is opened again the heating current is cut off, the bimetal blade 7 cools and therefore gradually tends to return to its previous position towards the stop 9. The stop 9 can be so arranged that upon the return of the bimetal blade 7 to the position shown in full lines the same condition is obtained as described above namely such that the spring 7 after maximal compression snaps the recording member 1 back into its original position in which it abuts against the stop 4. Consequently the recording tip 3 returns to its original position and the line track a" changes back to the normal line track a'. The embodiment according to FIG. 2 which is designed for oscillating recording, differs from that of FIGURE 1 by the fact that the recording arm or member 1 carries a contact 16 which in normal position abuts against a stationary contact 17. The latter is connected by a line 14' to one end of the heating coil 11. The line or connection 14 which in FIGURE 1 was connected to the last mentioned end of the heating coil 11 is in this case connected to a point on the recording member 1 which is in itself conductive.

If in this case the switch 15 is closed the first portion of the performance of the device is the same as that which was described above with reference to FIGURE 1. However as soon as the tip of the recording arm 1 is snapped against the stop 5 the contact 16 disengages the stationary contact 17 so that the current is interrupted while switch 15 is still in closed position. Consequently the blade 7 cools off and the blade 7 and the recording member 1 return to their previous position. Thereby contacts 16 and 17 engage each other again and the same performance repeats periodically as long as the switch 15 remains in closed position. The result of this performance is that on the record carrier the record a differs from the one shown in FIGURE 1 in that through the oscillation of the tip 3 heavy record portions a''' appear. As soon as the switch 15 is opened again the operational parts of the device return to their starting or normal position.

Figure 3:
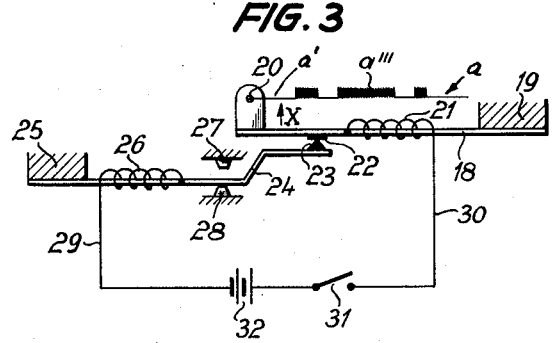
FIG. 3 is a modification of the embodiment of FIG. 2, including two bimetal members and one interrupter contact.
Figure 3A:
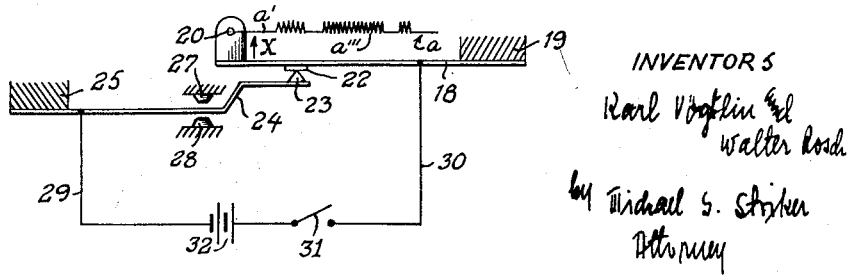
FIG. 3a is a modification of the embodiment of FIG. 3.

In the embodiment illustrated by FIGURE 3 two bimetal members are employed together with two contacts 22, 23 for periodically interrupting the current through the electrical circuit of the device. A bimetal blade 24 is supported at one end by a stationary support 25 and is surrounded by a heating coil 26. Instead of this coil which at one end is connected by a flexible line 29 to one terminal of the battery 32, and with its opposite end to the bimetal blade 24, the bimetal blade 24 itself may be used as a heating resistor by passing the current therethrough as illustrated by FIG. 3a. The blade 24 is free to move between the limiting stops 27 and 28. The recording member 18 carries a recording tip 20 in a similar manner as described above, and is supported at its other end by a stationary support 19. The member 18 is also a bimetal strip surrounded by a heating coil 21 connected at one end with the member 18 and with its other end through a flexible connection 30 to the other terminal of the battery 32, a switch 31 being inserted in this connection. The switch 31 corresponds to the switch 15 in FIGURES 1 and 2 and is also operated in accordance with the occurrence of phenomena to be recorded. Also the member 18 may be used directly as a heating resistor for creating the necessary heat under the action of the current furnished by battery 32 as illustrated by FIG. 3a. The member 18 carries a contact 22 opposite a contact 23 mounted on the tip of the bimetal blade 24.

In order to obtain the desired operation of this device it is necessary that the two bimetal elements 24 and 18 differ from each other with respect to their thermal reaction time. This can be arranged for by giving these two elements different mass so that their thermal inertia differs, or they may consist of bimetal elements which are characterized by a different rate of deformation or deflection as a function of a certain change of temperature. The arrangement must be such that the reaction time of the bimetal blade 24 is shorter than that of the bimetal member 18.

In operation, when the switch 31 is closed on account of the occurrence of a phenomenon to be recorded both heating coils 21 and 26 are heated because the contacts 22 and 23 are in engagement with each other. On account of the different characteristics of the two bimetal members 18 and 24, the blade 24 will deflect and therefore displace its tip and contact 23 faster than a deflection of the member 18 develops. Therefore the contact 23 abutting against contact 22 will force the member 18 to move in direction of the arrow X so that the recording tip 20 is moved away from its position registering with the track a'. As soon as the bimetal blade 24 abuts against the stop 27 the movement of the contact 23 is terminated. However due to the effect of the heating coil 21 the member 18 is still in a heated condition which causes the tip of the member 18 to move somewhat further in the direction of the arrow X. Now the contacts 22 and 23 are disengaged and the flow of electric current through both heating coils 21 and 26 is interrupted. Both bimetal members 18 and 24 cool off but due to the different thermal characteristics of both elements the blade 24 will return faster to the position in which it abuts against the stop 28. During this movement of the blade 24 the member 18 slowly follows so that the contacts 22 and 23 still remain separated until both bimetal members 18 and 28 have returned to their original position. Now however the contacts 22 and 23 in engagement with each other close again the circuit for the two heating coils 21 and 26 provided that the switch 31 is still in closed position so that now the same procedure repeats causing an oscillating record in the form of the heavy record elements $a'''$ which are discontinued only when the switch 31 is opened again.

It has been found that in certain cases the use of bimetal elements is not advisable because these elements are naturally extremely sensitive to changes of ambient temperature. Therefore, the embodiments illustrated by FIGURES 4–8 are equipped with a different type of heat-responsive means which can be used in those cases where the ambient temperature varies considerably.

Figure 4:
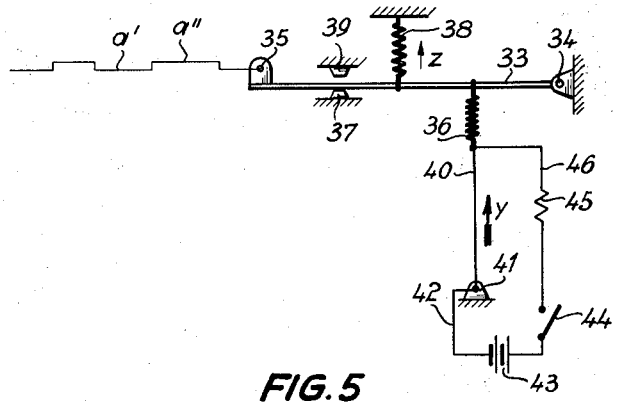
FIG. 4 illustrates diagrammatically another embodiment of the invention in which the heat-responsive means is an electrical conductor expanding upon heating.

In FIGURE 4 a recording member 33 is pivotally mounted for turning movement about a stationary pivot 34 and carries at its free end a recording tip 35. The member 33 is free to move between two stationary stops 37 and 39, under the action of a pull spring 38 tending to move the arm 33 in the direction of arrow Z. The action of spring 38 is counteracted by a stronger spring 36 attached with one end to the recording member 33 and with its other end to a wire 40 which at its opposite end is attached to a stationary member 41. It is therefore clear that the spring 36 serves to hold the member 33 ordinarily in the illustrated position abutting against stop 37, and simultaneously to hold the wire 40 by pull in the direction of the arrow Y in stretched condition. The end of the wire attached to the member 41 is connected by a conductor 42 to one terminal of a battery 43 while the other terminal of the battery is connected via a switch 44 and, if desired, a resistor 45 and a flexible conductor 46 to the other end of the wire 40. The switch 44 corresponds to the operating switch 15 in FIGURES 1 and 2 and is moved into closed position upon the occurrence of the phenomenon to be recorded.

In operation, the closing of switch 44 causes a current to flow through the wire 40 whereby the latter is heated and therefore expands. This expansion of wire 4 permits the pretensioned spring 36 to relax so that now its pull on the member 33 decreases and the spring 38 has enough strength to move the member 33 against stop 39. Consequently the recording tip 35 will cause the record to show a change from the track $a'$ to an offset line track $a''$. As soon as switch 44 is opened again the current is interrupted, the wire 40 contracts again and thereby causes the spring 36 to exert the necessary power to overcome the action of the spring 38 and to move the member 33 and the recording tip 35 back to its original position.

Figure 5:
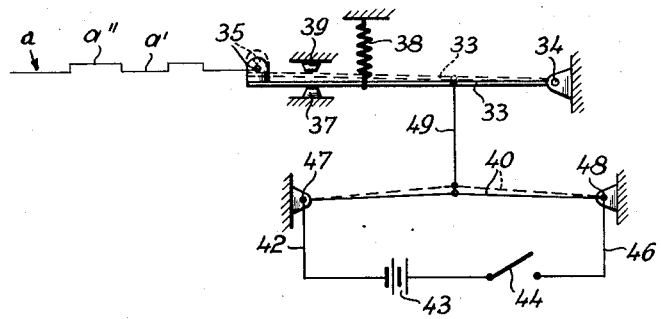
FIG. 5 is a modified form of the embodiment illustrated by FIG. 4.

FIGURE 5 illustrates a modification of the arrangement illustrated by FIGURE 4. In this case the spring 36 is eliminated. Instead the elastic force of the resistance wire 40 is used in the following manner. The wire 40 is stretched between two stationary support members 47 and 48 and is connected approximately in its center by a wire or equivalent member to a point of the recording member 33. The two opposite ends of the wire 40 are again connected in a circuit containing the conductors 42 and 46 and the control switch 44 with the battery 43. The arrangement is such that when switch 44 is open the tension in the wire 40 is sufficient to hold the recording member 33 through the connecting link or wire 49 in the position illustrated in full lines in which the member 33 abuts against the stop 37. However when switch 44 is closed and the wire 40 is accordingly heated it will expand and therefore make it possible that the spring 38 acting in the direction of the arrow Z moves the arm 33 and with it the recording tip 35 into the position illustrated in dotted lines.

Figure 6:
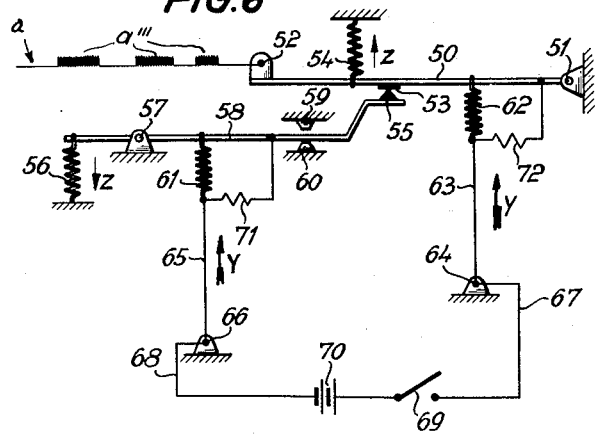
FIG. 6 illustrates diagrammatically an embodiment of the invention in which two electrical conductors which expand upon heating, and one interrupter contact are used.

The embodiment illustrated by FIGURE 6 is basically similar to that illustrated by FIGURE 3 except that in this case no bimetal members and no heating coils are used. Instead wires which expand upon being heated by current passing therethrough serve as the actuating or heat-responsive means. In this case the recording member 50 is pivotally mounted for movement about a stationary pivot 51 and carries at its free end the recording tip 52. A spring 54 attached to the member 50 adjusts the latter in the direction of the arrow Z. A stronger and pretensioned spring 62 is attached to the member 50 at one of its ends, and at its other end to one end of a wire 63 whose opposite end is attached to a stationary support 64. The spring 62 holds the wire 63 stretched by pulling in direction of the arrow Y and at the same time holds the member 50, counteracting the pull of spring 54, in a position in which a contact 53 mounted on the member 50 abuts against a contact 55 mounted at the free end of a lever 58. This lever is pivotally mounted on a stationary pivot 57 and is able to swing between two stationary stops 59 and 60. A spring 56 attached to the opposite end of the lever 58 tends to move that end thereof in the direction of the arrow Z while a second and pretensioned stronger spring 61 attached to the member 58 between the pivot 57 and the stops 59, 60 counteracts the effect of spring 56 and holds the lever 58 ordinarily in a position in which it abuts against the stop 60. The free end of the spring 61 is attached to one end of a second wire 65 whose opposite end is attached to a stationary member 66 so that the spring 61 pulling in direction Y holds the wire 65 in stretched condition. Those members 50 and 58 are substantially conductive and form a part of the electric circuit operating the device. As can be seen from FIGURE 6, the electrical circuit including the battery 70 is composed of the connector 68, the wire 65, a resistor 71, a portion of the lever 58, contacts 55 and 53, a portion of the recording member 50, resistor 72, wire 63, connection 67 and control switch 69 which is operated in accordance with the occurrence of phenomena to be recorded.

In operation, as soon as switch 69 is closed both wires 63 and 65 are heated by the current passing therethrough and expand accordingly. The wires 63 and 65 are chosen so that upon the application of the current the wire 65 expands faster than the wire 63. Through the expansion of the wire 65 the spring 61 relaxes and the lever 58 is comparatively rapidly moved into a position in which it abuts against the stop 59. This displacement or the motion of the contact 55 is during this procedure transmitted via the contact 53 to the recording member 50 so that the latter and together with the recording tip 52 is moved in the direction of the arrow Z with the result that the recording of a phenomenon which caused the closing of switch 69 is started. Meanwhile wire 63 has also been heated but at a slower rate of response so that the spring 62 relaxes slightly later so that only then the spring 54 continues to move the member 50 beyond the previously reached position in which case the contacts 53 and 55 separate. Thereby the entire circuit is interrupted, both wires 63 and 65 cool off, however wire 65 faster than the wire 63, or at least wire 65 contracts faster than the wire 63 so that first the lever 58 is moved back into its original position, followed by the recording member 50. At a certain moment both have returned to their original position, the contacts 53 and 55 are again in engagement so that, if switch 69 is still in closed position the whole procedure repeats. In this manner an oscillating recording of the form indicated at $a'''$ is obtained as long as switch 69 remains closed. The embodiment illustrated by FIGURE 7 is essentially a modification of the embodiment illustrated by FIGURE 2 except that in this case the bimetal blade 7 is replaced by a heatable wire which expands upon heating. The recording member 73 which carries a recording tip 76 is pivotally movable about a stationary pivot 74, the movement being limited between stationary stops 78 and 79. At its free end the member 73 carries a contact 77 which in normal position engages an opposite stationary contact 92. A lever 81 is pivotally mounted for turning movement about a stationary pivot 82. Its movement is limited by two stationary stops 83 and 84. A spring 85 attached to the lever 81 tends to urge the latter in direction toward the stationary stop 84, but this is counteracted by the pull exerted by a pretensioned spring 86 also attached to the member 81 at one of its ends, and attached at its other end to the end of a wire 87 whose opposite end is fixed to a stationary member 88. By the action of the spring 86 the wire 87 is held in stretched position by the pull in direction of the arrow Y. A compression spring 80 is interposed between the tips of the levers 81 and 73. The electrical circuit for heating the wire 87 by the energy furnished by battery 90 contains the control switch 89 operated in accordance with the occurrence of the phenomena to be recorded, the wire 87, a resistor 91, contacts 77 and 92 and conductor 93 leading back to the opposite terminal of battery 90.

Whenever the switch 89 is closed the wire 87 is heated and expands so as to relax the spring 86 which was capable of holding the lever 81 in the position shown wherein it abuts against the stop 83. Now the spring 85 moves the lever 81 in direction toward stop 84 until the maximum compression of spring 80 is obtained when the two opposite tips of members 81 and 73 are in line with each other. Thereafter, as has been described with respect to FIGURES 1 and 2, the spring 80 tending to expand snaps the lever 81 into its position in which it abuts against stop 84, and snaps the member 73 in direction of the arrow X until it abuts against the stop 79. When this occurs the recording tip 76 moves away from the line track a' and at the same time the contacts 77 and 92 separate from each other. Hereby the entire circuit is interrupted so that the wire 87 contracts, the spring 86 again moves the lever 81 toward its stop 83 so that the spring 80 again causes the member 73 to snap back into its original position in which the contacts 77 and 92 engage each other. Hereby the circuit is closed again and the whole procedure repeats. Consequently an oscillating recording producing the blocks a''' on the record carrier are produced.

The embodiment illustrated by FIGURE 8 is also based on the use of a wire which can be heated by an electric current so as to expand, but otherwise differs from the previous embodiments in that alternatively two different recordings can be produced so that a record of the occurrence of different phenomena can be recorded on the same record carrier by the same recording means. As can be seen in FIGURE 8 a wire 99 is stretched between a stationary member 100 which is connected to the positive terminal of the battery, and the end 95' of a lever having two arms 98 and 95 and mounted for pivotal movement in a bearing 96. The two-arm bell-crank lever 95, 98 is the recording member of the device and carries with its free end the recording tip 97. The arm 98 carries two lateral arms 110 and 111 which will be described further below. These two arms are located at different radial distances from the pivot point in bearing 96 so that at a certain angular movement of the lever 98 the ends of the arms 110 and 111 move correspondingly different distances.

Two contact arms 103 and 104 are mounted separately, for pivotal movement about a stationary point, in the device. The contact arms 103 and 104 carry at their tips a contact which in ordinary position of the lever is in engagement with a corresponding stationary contact 105, 106, respectively. A manually operable change-over switch 109 is connected at its pivot point with the grounded minus pole of the battery (not shown) and can be moved so as to make contact either with the stationary contact 109' or with the contact 109''. The contact 109' is connected by a line 107 with the contact arm 103 while the contact 109'' is connected by a connection 108 with the contact arm 104. Contact 105 is connected by a connection 101 with the above mentioned end 95' of the lever arm 95 while the contact 106 is connected by line 102 to the same point 95', to which one end of the wire 99 is connected. It is therefore clear that when the switch 109 is moved in one or the other of its operative positions either the circuit via contact 105 is closed for heating the wire 99 or the connection via the contact 106 is closed for heating the wire 99. A compression spring 112 corresponding in its function to the spring 6 in FIGURES 1 and 2 or spring 80 in FIGURE 7, is interposed between the tips of the contact lever 103 and the end of the arm 110, and a similar spring 113 is interposed between the tips of the contact arm 104 and the arm 111, respectively. A spring 116 fastened with its one end to end 95' of lever 95, 98 and its other end to a stationary part 117 tries to pivot lever 95, 98 in clockwise direction thereby also keeping wire 99 under tension.

As long as the switch 109 is in neutral position the recording tip 97 will produce on the record carrier a line track a'. If however the contact 109 is moved into the position in which it closes the circuit for the contacts 103 and 105 the wire 99 is heated and expands correspondingly. Consequently under the action of the spring 116 the crank lever 95, 98 is able to swing in the direction of the arrow X so that the recording tip 97 moves transversely off the line track a'. As the swing of the lever 95 proceeds also the arm 110 swings about the bearing point 96 so that the spring 112 is increasingly compressed until, similarly as was the case in the example of FIGURE 1, the spring 112 passing through dead center snaps the contact arm 103 away from contact 105 until it abuts against a stationary stop 105'. The amount of swing of the arms of lever 95 is limited by the degree of expansion of the wire 99. This also limits the swing of the recording tip 97. However by the deflection of the contact arm 103 the circuit for the wire 99 has been interrupted so that it will immediately start to cool and to contract whereby the recording member 95, 98 and the recording tip 97 are returned to the previous position. Simultaneously the performance of spring 112 is repeated in opposite sense so that after a certain movement of the arm 110 the spring 112 snaps the contact arm 103 back into its normal position and likewise forces the arm 95 into its normal position in which it abuts against the stationary stop 98'. It is to be understood that during the swing of the arm 98 in direction of arrow X the spring 113 may have passed or may not have passed through the point of maximum compression so that the lever 104 may have remained in its original position as illustrated in FIGURE 8 or not. A snapping action of spring 113 however, does not in any way affect the swinging movement of lever 95, 58 as the circuit 100, 99, 102, 106, 104, 108, 109 is without current.

As long as the switch 109 remains in contact with the stationary contact 109' the above described action of the recording member 95 and the recording tip 97 repeats so that on the record an oscillatory recording as shown at 114 is produced.

If on the other hand the switch 109 is moved into a position in which it contacts the stationary contact 109'', the circuit for heating the wire 99 is completed via the contacts 104 and 106. As the wire 99 expands the bell-crank lever 95, 98 again swings in the direction of the arrow X. However, in this case the circuit will be closed and the electric current remain applied for a longer period because due to the smaller distance of the end of arm 111 from the pivot 96 a greater angle of swing is required until the spring 113 is in maximum compressed condition whereafter it snaps the lever 104 into its position in which it abuts against the stationary stop 106'. Again the bell-crank 95, 98 is moved under the snap action of the spring 113 in direction of the arrow X except to a greater degree than before, which movement is limited by the expanded condition of the wire 99. The greater angular swing of the recording member 95 and of the recording tip 97 produces a greater transversal movement of the tip 97 from the track line $a'$. In the meantime the contacts 104 and 106 are being separated so that the current was cut off, the wire 99 contracts again and therefore moves the recording member 95 with its recording tip 97 back to its normal position abutting against the stop 98'. During this return movement the spring 113 exerts again its snap action so as to return the contact arm 104 into the starting position as shown in FIGURE 8 whereby the circuit is closed so that the whole performance repeats as long as the switch 109 is in its position in contact with contact 109''. By this repeated performance an oscillatory recording as shown at 115 is produced and it can be noticed that this recording shows a greater amplitude or width than the previous recording 114. In this manner the recording of different phenomena, effected through the different positions of the switch 109 can be differentiated.

The fact that during the operation of the spring 113 and the opening and closing of the contacts 104, 106 also the spring 112 has acted in the previously described manner so that during that operation contacts 103 and 105 were temporarily separated and re-engaged does not affect the performance of the device because the circuit for contacts 103, 105 was not closed.

A switch 120 is shown in the connection 107 and a switch 121 in the connection 108. These switches have not been described above so that it had to be assumed that the switches are either closed or not existent. In this case the switch 109 may be used as the main control switch which is operated in one or the other direction depending upon the occurrence of one or the other phenomenon that is to be recorded. However the device, if it includes the switches 120 and 121, may be used in such a manner that if only one phenomenon is to be recorded the switch 109 is placed in one of its positions, for instance in contact with the contact 109', and then only the switch 120 is to be operated in correspondence with the occurrence of that one phenomenon that is to be recorded. If only a different phenomenon is to be recorded then the switch 109 may be moved into its opposite position and only the switch 121 is to be operated in accordance with the occurrences of this other phenomenon that is to be recorded. Finally it is still possible to eliminate the switch 109 and replace it by a permanent connection between the minus pole of the battery and both lines 107 and 108 so that then the two switches 120 and 121 may be independently operated in accordance with the occurrence of two different phenomena. Both may be recorded in the manner illustrated in FIGURE 8 at 114 and 115.

It will be understood that each of the elements described above, or two or more together, may also find a useful application in other types of recorder mechanisms differing from the types described above.

While the invention has been illustrated and described as embodied in a recorder mechanism controlled by heat-responsive means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a recorder mechanism, in combination, movable recording means adapted to produce, during movement, a record on a record carrier; a pair of first stop means limiting the movement of said movable recording means in one direction and in the opposite direction; bimetal means so constructed and mounted that, upon heating, at least a portion thereof is displaced; a pair of second stop means limiting the displacement of said portion of said bimetal means in one direction and in the opposite direction; mechanical motion-transmitting means mounted between said bimetal means and said movable recording means for transmitting motions of said portion of the former, while being displaced, to the latter so that said movable recording means produces records proportionate to the displacements of said portion of said bimetal means during heating thereof, said motion-transmitting means being an elastic member urging said bimetal means and said recording means into their normal position in which they abut against one of their respective stop means when said bimetal means is not heated, and urging said bimetal means and said recording means into a displaced position in which they abut against the other one of their respective stop means when said portion of said bimetal means, upon being heated, has been displaced a predetermined amount; and electrical means for heating said bimetal means.

2. In a recorder mechanism, in combination, movable recording means adapted to produce, during movement, a record on a record carrier; a pair of first stop means limiting the movement of said movable recording means in one direction and in the opposite direction; bimetal means so constructed and mounted that, upon heating, at least a portion thereof is displaced; a pair of second stop means limiting the displacement of said portion of said bimetal means in one direction and in the opposite direction; mechanical motion-transmitting means mounted between said bimetal means and said movable recording means for transmitting motions of said portion of the former, while being displaced, to the latter so that said movable recording means produces records proportionate to the displacements of said portion of said bimetal means during heating thereof, said motion-transmitting means being an elastic member urging said bimetal means and said recording means into their normal position in which they abut against one of their respective stop means when said bimetal means is not heated, and urging said bimetal means and said recording means into a displaced position in which they abut against the other one of their respective stop means when said portion of said bimetal means, upon being heated, has been displaced a predetermined amount; and electrical circuit means connected to said bimetal means and including switch means, adapted to open and to close, respectively, a circuit for heating said bimetal means in conformity with the occurrence and the termination, respectively, of a phenomenon to be recorded, said bimetal means being connected as a portion of said circuit means for being heated by a current passing therethrough when said switch means is in closed position.

3. In a recorder mechanism, in combination, movable recording means adapted to produce, during movement, a record on a record carrier; a pair of first stop means limiting the movement of said movable recording means in one direction and in the opposite direction; bimetal means so constructed and mounted that, upon heating, at least a portion thereof is displaced; a pair of second stop means limiting the displacement of said portion of said bimetal means in one direction and in the opposite direction; mechanical motion-transmitting means mounted between said bimetal means and said movable recording means for transmitting motions of said portion of the former, while being displaced, to the latter so that said movable recording means produces records proportionate to the displacements of said portion of said bimetal means during heating thereof, said motion-transmitting means being an elastic member urging said bimetal means and said recording means into their normal position in which they abut against one of their respective stop means when said bimetal means is not heated, and urging said bimetal means and said recording means into a displaced position in which they abut against the other one of their respective stop means when said portion of said bimetal means, upon being heated, has been displaced a predetermined amount; and electrical circuit means connected to said bimetal means and including switch means adapted to open and to close, respectively, a circuit for heating said bimetal means in conformity with the occurrence and the termination, respectively, of a phenomenon to be recorded, a heating resistor being located adjacent to said bimetal means and being connected as a portion of said circuit means for heating said bimetal means when said switch means is in closed position.

4. In a recorder mechanism, in combination, movable recording means adapted to produce, during movement, a record on a record carrier; bimetal means so constructed and mounted that, upon heating, at least a portion thereof is displaced; mechanical motion-transmitting means mounted between said bimetal means and said movable recording means for transmitting motions of said portion of the former, while being displaced, to the latter so that said movable recording means produces records proportionate to the displacements of said portion of said bimetal means during heating thereof; and electrical circuit means connected to said bimetal means and including switch means adapted to open and to close, respectively, a circuit for heating said bimetal means in conformity with the occurrence and the termination, respectively, of a phenomenon to be recorded, said circuit means further including interrupter contact means being held in closed position when said bimetal means is not heated, and being moved to open position when said portion of said bimetal means, upon heating, is displaced, whereby in operation an oscillating recording is produced.

5. A recorder mechanism as set forth in claim 4, wherein said movable recording means is a bimetallic member having a longer thermal reaction time characteristic than said bimetal means and being of a type of which, upon heating, at least a portion is displaced, second heating means being provided for heating said bimetallic member, and said interrupter contact means being mounted between said bimetal means and said bimetallic member so as to act as said motion-transmitting means and being connected within said circuit means in series with said means for heating said bimetal means and with said second heating means for heating said bimetallic member.

6. In a recorder mechanism, in combination, movable recording means adapted to produce, during movement, a record on a record carrier by moving between a normal and a displaced position; first spring means urging said movable recording means into said displaced position; first resistance wire means which lengthen with rising temperature, so that, upon heating, at least one portion thereof is displaced; first mechanical motion-transmitting means consisting of second spring means in prestressed condition mounted between said portion of said wire means and said movable recording means for holding said wire means in stretched position and for urging said movable recording member into its normal position against the action of said first spring means, and for transmitting the displacement of said portion of said wire means to said recording means when said wire means is lengthened upon heating and said second spring means is relaxed thereby; a movable member mounted for movement in the same plane as said movable recording means and abutting with one portion against a portion of said recording means, when the latter is in normal position, cooperating interrupter contact means being mounted at said portion of said recording means and at said portion of said movable member, respectively, so as to be in closed position as long as said portions abut against each other; a pair of stop means for limiting the movement of said movable member in one direction and in the opposite direction; second resistance wire means which lengthen with rising temperature at a faster rate than said first resistance wire means, so that, upon heating, at least one portion thereof is displaced faster than said one portion of said first resistance wire means; third spring means urging said movable member into a position in which said portion thereof abuts against said portion of said recording means or against one of said pair of second stop means whichever opposes the movement of said movable member; second motion-transmitting means consisting of fourth spring means in prestressed condition mounted between said portion of said second wire means and said movable member for holding said second wire means in stretched condition and for urging said movable member into its normal position against the action of said third spring means away from said one of said pair of stop means and against the second one thereof, and for transmitting the displacement of said portion of said second wire means to said movable member when said second wire means is lengthened upon heating and said fourth spring means is relaxed thereby; and electrical circuit means connecting said first wire means, said interrupter contact means and said second wire means in series with each other for heating said first and second wire means, said circuit means including switch means adapted to open and to close, respectively, said circuit in conformity with the occurrence and termination, respectively, of a phenomenon to be recorded, whereby in operation an oscillatory recording is produced.

7. In a recorder mechanism, in combination, movable recording means adapted to produce, during movement, a record on a record carrier; a pair of first stop means limiting the movement of said recording means in one and in the opposite direction; a movable member mounted for movement in the same plane as said movable recording means and spaced therefrom; a pair of second stop means limiting the movement of said movable member in one and the opposite direction; first motion-transmitting means consisting of an elastic member mounted between said movable member and said movable recording means urging said movable member and said recording means into their normal positions, respectively, in which they abut against one of their respective stop means, and urging said movable member and said movable recording means into a displaced position in which they abut against the other one of their respective stop means when said movable member has been displaced a predetermined amount; first spring means urging said movable member towards its said displaced position in which it abuts against said other one of said pair of second stop means; resistance wire means which lengthen with rising temperature so that at least a portion thereof is displaced; second motion-transmitting means consisting of second spring means in prestressed condition mounted between said wire means and said movable member for holding said wire means in stretched condition and urging said movable member in its normal position in which it abuts against said one of said pair of second stop means, and for transmitting the displacement of said portion of said wire means to said movable member when said wire means is lengthened upon heating and said second spring means is relaxed thereby; and electrical circuit means connected to said wire means and including switch means adapted to open and to close, respectively, said circuit for heating said wire means in conformity with the occurrence and termination, respectively, of a phenomenon to be recorded, said circuit means further including interrupter contact means operatively connected with said movable recording means so as to be held in closed position when said wire means is not heated, and being moved to open position when said recording means is moved into its displaced position, whereby in operation an oscillating recording is produced.

8. In a recorder mechanism, in combination, movable recording means adapted to produce, during movement, on a record carrier a plurality of types of recordings having predetermined respectively different significances; resistance wire means which lengthen with rising temperature so that, upon heating, at least one portion thereof is displaced; first motion transmitting means mounted between said wire means and said movable recording means for transmitting displacements of said portions of said wire means, while being displaced, to said recording means from a normal position into any one of a plurality of displaced recording positions; first electric circuit means including first contact means in series with said wire means for heating the latter; second electric circuit means including second contact means in series with said wire means for heating the latter; second motion transmitting means mounted between one portion of said movable recording means and said first contact means for moving the latter between a normally closed position and an open position depending upon a first predetermined amount of movement of said movable recording means upon heating said wire means; third motion-transmitting means mounted between another portion of said movable recording means and said second contact means for moving the latter between a normally closed position and an open position depending upon a second predetermined amount of movement, larger than said first predetermined amount, of said movable recording means upon heating said wire means; means for urging said movable recording means in direction towards said displaced recording positions and for holding said wire means in stretched condition so that said movable recording means is moved when said wire means is heated and thereby lengthened; and electrical control means for rendering alternatively said first and said second circuit means operative depending upon whether one or another one of phenomena to be recorded occur, whereby different types of oscillatory recordings having respectively different significances corresponding to one or the other of said phenomena are produced in accordance with the operation of said electrical control means.

9. In a recorder mechanism, in combination, recording means adapted to carry out a reciprocating movement between a normal and at least one displaced position for thereby recording phenomena of variable duration; resistance wire means capable of lengthening with rising temperature from a first predetermined length to a second predetermined length, and of shortening with falling temperature from said second to said first length; mechanical motion-transmitting means mounted between said resistance wire means and said movable recording means for actuating the latter depending upon lengthening and shortening of said resistance wire means in such a manner that upon lengthening of said resistance wire means from said first to said second predetermined length thereof said recording means moves from said normal to a displaced position thereof, and upon shortening of said resistance wire means from said second to said first predetermined length thereof said recording means moves from said displaced to said normal position thereof; electrical circuit means comprising an electric circuit for causing heating of said resistance wire means when connected thereto, and means for connecting said resistance wire means to said electric circuit only while said resistance wire means has said first predetermined length and while it is lengthening from said first to said second predetermined length thereof, but disconnecting said electric circuit when said second predetermined length of said resistance means is reached and while said resistance wire means shortens from said second to said first predetermined length thereof; and means for energizing said electric circuit in conformity with the occurrence and for the duration of a phenomenon to be recorded by movement of said recording means between said normal and displaced positions thereof.

References Cited in the file of this patent
UNITED STATES PATENTS

| 1,098,931 | Akimoff | June 2, 1914 |
| 1,979,713 | Smulski | Nov. 6, 1934 |
| 2,480,443 | Branson | Aug. 30, 1949 |
| 2,547,074 | Cirlin | Apr. 3, 1951 |
| 2,653,853 | Goodwin | Sept. 29, 1953 |
| 2,684,279 | Imm | July 20, 1954 |

FOREIGN PATENTS

| 162,415 | Germany | July 31, 1905 |
| 591,519 | Great Britain | Aug. 20, 1947 |